United States Patent
Lin et al.

(10) Patent No.: US 9,571,189 B2
(45) Date of Patent: *Feb. 14, 2017

(54) IN-SERVICE MONITORING OF A FIBEROPTIC NETWORK

(71) Applicant: Lumentum Operations LLC, Milpitas, CA (US)

(72) Inventors: Yuan Lin, Ottawa (CA); Brian Sungwan Kim, Ottawa (CA); John Parry, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,300

(22) Filed: Mar. 4, 2016

(65) Prior Publication Data

US 2016/0191154 A1   Jun. 30, 2016

Related U.S. Application Data

(63) Continuation of application No. 14/521,878, filed on Oct. 23, 2014, now Pat. No. 9,281,893.

(60) Provisional application No. 61/894,552, filed on Oct. 23, 2013.

(51) Int. Cl.
| | | |
|---|---|---|
| H04B 10/00 | (2013.01) | |
| H04B 10/079 | (2013.01) | |
| H04B 10/071 | (2013.01) | |
| H04B 10/548 | (2013.01) | |
| H04J 14/00 | (2006.01) | |

(52) U.S. Cl.
CPC ...... *H04B 10/07957* (2013.01); *H04B 10/071* (2013.01); *H04B 10/548* (2013.01)

(58) Field of Classification Search
CPC . H04B 10/073; H04B 10/077; H04B 10/0771; H04B 10/0775
See application file for complete search history.

(56) References Cited

U.S. PATENT DOCUMENTS

| | | |
|---|---|---|
| 5,104,391 A | 4/1992 | Ingle et al. |
| 5,532,864 A | 7/1996 | Alexander et al. |
| 6,005,694 A | 12/1999 | Liu |
| 6,650,840 B2 | 11/2003 | Feldman |
| 7,295,778 B2 | 11/2007 | Lee et al. |
| 7,310,135 B2 | 12/2007 | Wisseman |
| 7,869,708 B2 | 1/2011 | Evangelides, Jr. et al. |
| 8,175,454 B2 | 5/2012 | Xia et al. |
| 8,175,458 B2 | 5/2012 | Way |
| 8,606,106 B2 | 12/2013 | Healey et al. |
| 8,634,713 B2 | 1/2014 | Campanelli et al. |
| 8,655,166 B2 | 2/2014 | Soto et al. |
| 8,655,167 B1 | 2/2014 | Lam et al. |
| 8,670,662 B2 | 3/2014 | Healey et al. |
| 8,750,703 B2 | 6/2014 | Effenberger |

(Continued)

FOREIGN PATENT DOCUMENTS

WO   WO 2011/104319   9/2011

*Primary Examiner* — Daniel Dobson
(74) *Attorney, Agent, or Firm* — Harrity & Harrity, LLP

(57) ABSTRACT

An optical fiber breakage point may be located by coupling to the optical fiber an out-of-band optical test signal modulated at a periodic modulation pattern. A distance to the breakage point may be determined from a difference between modulation patterns of transmitted and received test signals.

20 Claims, 14 Drawing Sheets

(56) References Cited

U.S. PATENT DOCUMENTS

| | | |
|---|---|---|
| 9,281,893 B2* | 3/2016 | Lin .................... H04B 10/071 |
| 2006/0007426 A1 | 1/2006 | Weller |
| 2007/0086332 A1 | 4/2007 | Way et al. |
| 2007/0103670 A1 | 5/2007 | Sezerman et al. |
| 2008/0019694 A1 | 1/2008 | Song et al. |
| 2008/0193132 A1 | 8/2008 | Matsui et al. |
| 2009/0162052 A1 | 6/2009 | Xia et al. |
| 2012/0243863 A1 | 9/2012 | Zhao et al. |
| 2013/0230310 A1 | 9/2013 | Wellbrock et al. |
| 2013/0322871 A1* | 12/2013 | Hsiao .................... H04B 10/07 398/25 |

\* cited by examiner

IN-SERVICE MONITORING OF A FIBEROPTIC NETWORK

CROSS-REFERENCE TO RELATED APPLICATIONS

This application is a continuation of U.S. application Ser. No. 14/521,878, filed Oct. 23, 2014 (now U.S. Pat. No. 9,281,893), which claims priority from U.S. Provisional Patent Application No. 61/894,552, filed Oct. 23, 2013, the disclosures of which are incorporated herein by reference.

TECHNICAL FIELD

The present disclosure relates to optical communications equipment, and in particular to in-service monitoring of optical networks.

BACKGROUND

In a fiberoptic network, optical signals are encoded with digital streams of information and transmitted through a series of spans of optical fiber. At a receiver end, the optical signals are detected and decoded by a receiver. In Fiber to the Home (FTTH) applications, modulated optical carrier signals are used to relay broadband coaxial cable signals to and from end users. Similarly, in Fiber to the Antenna (FTTA) applications, modulated optical carrier signals are used to relay broadband radio frequency (RF) signals to and from antennas. In FIT A applications, a single optical fiber is used for bidirectional transmission, with a 1550 nm wavelength band being typically used for downstream transmission from a central station to an RF antenna, and a 1310 nm wavelength band used for an upstream transmission, that is, from the RF antenna back to the central station.

As passive fiberoptic links find an increasing use, so increase occurrences of fiber breakage, faulty fiber connections, open fibers, etc. A fiber breakage, or a mere deterioration of a fiber transmission, may occur during normal operation of a passive fiberoptic link. Thus, a need exists for monitoring fiber network integrity and performance level.

One drawback of prior art monitoring systems is that a precise location of the fiber breakage point in a fiberoptic network is unknown. Since fiberoptic network may span for leas and even hundreds of kilometers in some cases, it is desirable that a monitoring system have a fiber break locating functionality.

One known method of determining a distance to a fiber breakage is Optical Time-Domain Reflectometry (OTDR). In OTDR, a powerful laser pulse is launched at a proximal end of a fiberoptic link, and a time dependence of the reflected light power is monitored. Since speed of light in the fiberoptic link being tested is known, the distance to a fiber breakage point may be determined by measuring a time delay between the launched pulse and a pulse reflected from the fiber breakage point. OTDR, however, may disturb normal operation of a fiberoptic link, because the powerful laser pulse may interfere with optical data transmission. Furthermore. OTDR output data are rather complex, and require trained personnel to interpret.

SUMMARY

In one embodiment, an optical fiber breakage point may be located by coupling to the optical fiber an out-of-band optical test signal modulated at a modulation frequency that is periodically swept or ramped in time. A distance to the breakage point may be determined from a difference between a value of the modulation frequency of the optical test signal reflected from the breakage point, and a current value of the modulation frequency of the optical signal being coupled to the optical fiber.

In some implementations, there is provided a system for in-service monitoring of a fiberoptic network comprising a first fiberoptic link spanning between a test location and a first remote location, wherein the first fiberoptic link carries a first information signal at a first wavelength between the test location and the first remote location, the system comprising:

a transmitter comprising a light source for generating an optical test signal at a test wavelength different from the first wavelength, wherein the optical test signal is modulated at a modulation frequency periodically swept at a sweep period from a first modulation frequency to a second modulation frequency;

a first test channel comprising:

a first coupler for optically coupling the light source to the first fiberoptic link at the test location, for causing the optical test signal to propagate along the first fiberoptic link towards the first remote location;

a first wavelength-selective reflector for optically coupling into the fiberoptic link at the first remote location, for redirecting the optical test signal at the test wavelength to propagate back towards the test location, while propagating therethrough the first information signal at the first wavelength;

a first signal photodetector optically coupled to the first coupler, for defecting a first returning optical test signal at the test wavelength propagating in a direction from the first remote location towards the first coupler; and controller operationally coupled to the first signal photodetector and operable to:

determine a magnitude of the second returning optical test signal;

determine a modulation frequency offset of the second returning optical test signal relative to a current value of the periodically swept modulation frequency; and detect a fault in the second fiberoptic link based on at least one of:

a comparison between the determined magnitude of the second returning optical test signal and a reference magnitude of the optical test signal redirected by the second wavelength-selective reflector; and a comparison between the determined modulation frequency offset of the second returning optical test signal to a reference modulation frequency offset of the optical test signal redirected by the second wavelength-selective reflector.

In one embodiment, the transmitter comprises a linear frequency ramp generator operably coupled to the light source for modulating the light source so that the modulation frequency is ramped linearly during each sweep period. The system may be expanded or upgraded to monitor multiple fiberoptic links of the fiberoptic network, by providing a Similar, separate test channel tor each additional fiberoptic link to be monitored.

In accordance with the embodiments disclosed herein, there is further provided a method for in-service monitoring of a fiberoptic network comprising a fiberoptic link spanning between spaced apart a test location and a remote location, wherein the fiberoptic link carries an information signal at a first wavelength between the test location and the remote location, the method comprising:

(a) generating an optical test signal at a test wavelength different from the first wavelength, wherein the optical test signal is modulated at a modulation frequency periodically swept at a sweep period from a first modulation frequency to a second modulation frequency;

(b) optically coupling the optical test signal to the fiberoptic link at the test location, thereby causing the optical test signal to propagate along the fiberoptic link to the remote location;

(c) using a wavelength-selective reflector disposed at the remote location to redirect the optical test signal at the test wavelength to propagate back towards the test location, while propagating therethrough the information signal;

(d) detecting a returning optical least signal at the test wavelength propagating in a direction from the remote location towards the test location;

(e) determining a magnitude of the returning optical test signal, and determining a modulation frequency offset of the returning optical test signal relative to a current value of the periodically swept modulation frequency; and (f) detecting a fault in the fiberoptic link based on at least one of:
a comparison between the magnitude of the first returning optical test signal determined in step (c) and a reference magnitude of the optical test signal redirected by the wavelength-selective reflector in step (c); and
a comparison between the modulation frequency offset of the returning optical test signal determined in step (e) and a reference modulation frequency offset of the optical test signal redirected by the wavelength-selective reflector in step (c).

Step (f) of the above method may include determining that a fiber break has occurred in the fiberoptic link when the modulation frequency offset of the returning optical test signal is smaller than the reference modulation frequency offset; and/or determining that a deterioration has occurred in the fiberoptic link when a magnitude of the returning optical signal at the reference modulation frequency offset is less than the reference magnitude.

BRIEF DESCRIPTION OF THE DRAWINGS

Exemplary embodiments will now be described in conjunction with the drawings, in which:

FIG. 10.

DETAILED DESCRIPTION

Figure 1A:
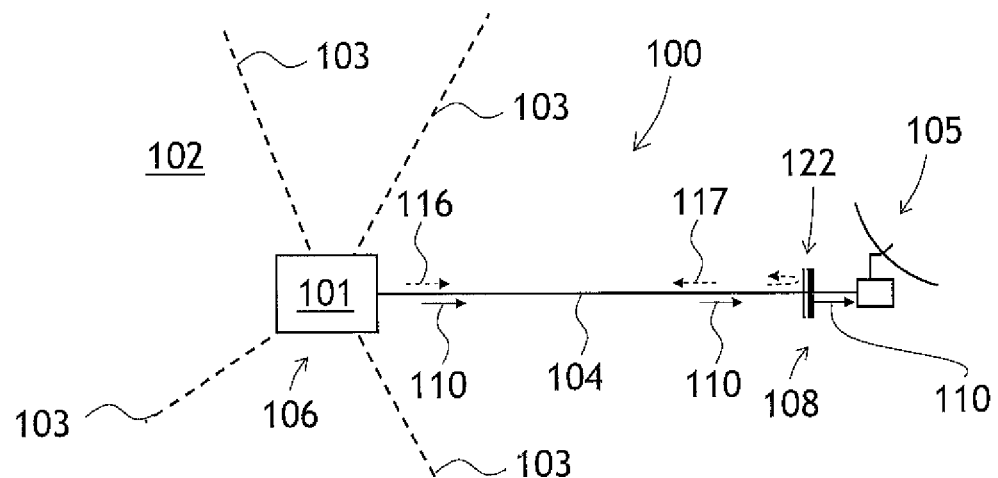
FIG. 1A illustrates a schematic view of a fiberoptic network having installed an in-service monitoring system.

While the present teachings are described in conjunction with various embodiments and examples, it is not intended that the present teachings be limited to such embodiments. On the contrary, the present teachings encompass various alternatives and equivalents, as will be appreciated by those of skill in the art. In FIGS. 1A, 1B, 2, and 7 to 11, similar reference numerals refer to similar elements.

Referring to FIG. 1A, a system 100 for in-service monitoring of a fiberoptic network 102 may be provided as described below. The fiberoptic network 102 may include a network node 101 and a plurality of fiberoptic links 103 including a first fiberoptic link 104. The fiberoptic links 103, 104 are connected to the network node 101. The system 100 is shown installed into the first fiberoptic link 104 for monitoring the first fiberoptic link 104, which spans between a test location 106 and a first remote location 108 of the fiberoptic network 102.

During normal operation, the first fiberoptic link 104 carries a first information signal 110 at a first wavelength $\lambda_1$ between the test location 106 and an RF antenna 105 disposed at the first remote location 108, for radio transmission of the first information signal 110. Of course, the RF antenna 105 is only an example, and may be replaced with another terminal device, or another node, not shown, of the fiberoptic network 102. Furthermore, the transmission on the first fiberoptic link 104 may be, and frequently is, bidirectional.

Figure 1B:
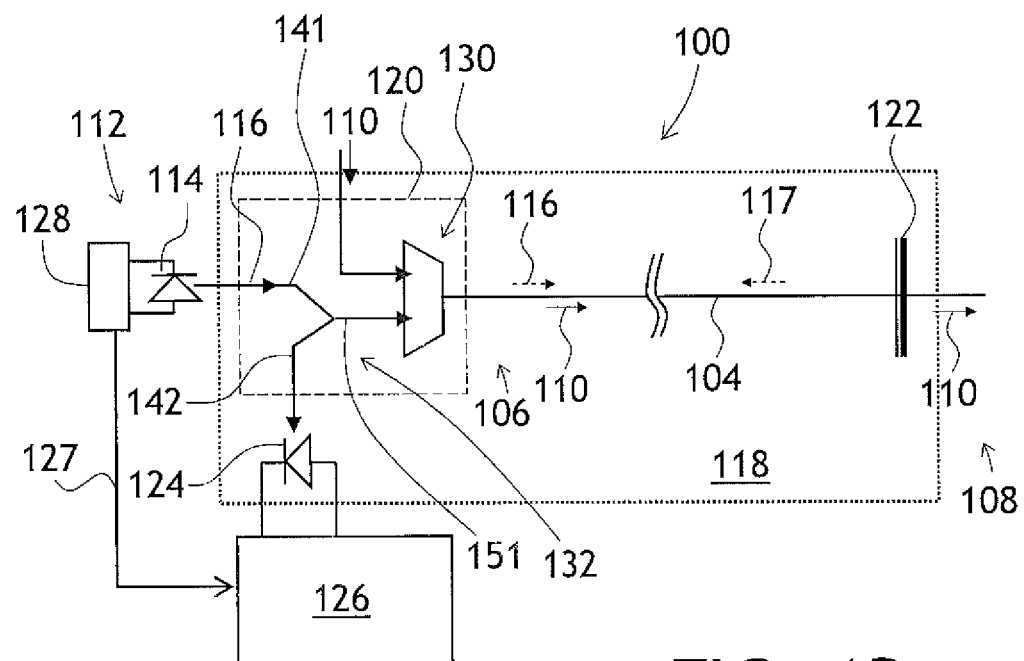
FIG. 1B illustrates a schematic view of the in-service monitoring system installed in the fiberoptic network of FIG. 1A.

Turning to FIG. 1B, the system 100 is shown in a greater detail. The system 100 may include a transmitter 112 including a light source 114 and a modulator/driver 128 operationally coupled to the light source 114. The light source 114 (e.g. a laser diode) generates an optical test signal 116 at a test wavelength $\lambda_T$ different from the first wavelength $\lambda_1$. In accordance with one embodiment, the optical test signal 116 is modulated by the modulator/driver 128 at a modulation frequency f, which is periodically swept at a sweep period T from a first modulation frequency $f_1$ to a second, different modulation frequency $f_2$. Depending on construction of the modulator/driver 128. the modulation frequency may be swept linearly or non-linearly from frequency $f_1$ to frequency $f_2$. The optical test signal 116 may also be amplitude modulated, phase modulated, or frequency modulated. An external modulator may also be used (not shown in FIG. 1B).

The system 100 further includes a first "test channel" 118 dedicated to monitoring the first fiberoptic link 104. The first test channel 118 may include a first coupler 120 for optically coupling the light source 114 to the first fiberoptic link 104 at the test location 106, for propagating the optical test signal 116 generated by the light source 114 along the first fiberoptic link 104 towards the first remote location 108. In the embodiment shown, the first coupler 120 includes a wavelength division multiplexor (WDM) 130 for multiplexing the optical test signal 116 at the test wavelength $\lambda_T$ and the first information signal 110 at the first wavelength $\lambda_1$, and an optical splitter 132 optically coupled at its output port 151 to the WDM 130.

The first test channel 118 may further include a first wavelength-selective reflector 122 (FIG. 1B) optically coupled into the first fiberoptic link 104 at the first remote location 108 (FIG. 1A), for redirecting e.g. reflecting the optical test signal 116 at the test wavelength $\lambda_T$ to propagate back towards the test location 106. At the same time, the first wavelength-selective reflector 122 may propagate through, e.g. transmit, the first information signal 110 at the first wavelength $\lambda_1$, for reception at the RF antenna 105 or another terminal or intermediate communications device, as the case may be.

The first test channel 118 may further include a first signal photodetector 124 optically coupled to the first coupler 120, for detecting a first returning optical test signal 117 at the test wavelength $\lambda_T$ propagating in a direction from the first remote location 108 towards the first coupler 120 disposed at the test location 106. More specifically, the first signal photodctector 124 is optically coupled to the optical splitter 132. which is optically coupled to the WDM 130, which is optically coupled to the first fiberoptic link 104 at the test location 106.

In the embodiment shown in FIG. 1B, the optical splitter 132 has first 141 and second 142 input ports and an output port 151. The assignment of ports as "input" and "output" ports is for convenience only, because the optical splitter 132 is a bidirectional device. The first input port 141 is optically coupled to the light source 114 of the transmitter 112 for coupling the optical test signal 116 into the first fiberoptic link 104, and the second input port 142 is optically coupled to the first signal photodctector 124, for receiving the first returning optical test signal 117. The output port 151 is optically coupled to the WDM 130 for launching the optical test signal 116 and for receiving the first returning optical test signal 117.

The system 100 may further include a controller 126 operationally coupled to the first signal photodetector 124. The controller 126 may be operable, e.g. via a software or hardware configuration, to determine a modulation frequency offset $\Delta f$ of the first returning optical test signal 117 relative to a current value of the periodically swept modulation frequency f, and determining a magnitude $M(\Delta f)$ of the first returning optical test signal 117 at the modulation frequency offset $\Delta f$. The current modulation signal at the periodically swept modulation frequency f may be obtained by the controller 126 from the modulator/driver 128 via a control line 127.

The controller 126 may be further configured for detecting a fault in the first fiberoptic link 104 based on the determined modulation frequency offset $\Delta f$ and the determined magnitude $M(\Delta f)$ of the first returning optical test signal 117. More specifically, the controller 126 may be configured for determining the fault in the first fiberoptic link 104 based on the determined modulation frequency offset $\Delta f$ and the determined magnitude $M(\Delta f)$ in relation to a "reference" modulation frequency offset $\Delta f_{REF}$ and a "reference" magnitude $M_{REF}(\Delta f_{REF})$, respectively, of the optical test signal 116 redirected by the first wavelength-selective reflector 122 to propagate back to the test location 106. In other words, the first wavelength-selective reflector 122 may function as an amplitude and frequency reference for the detected first returning optical test signal 117. allowing a length-to-fault and optical throughput calibration. During setting up of the monitoring system 100, a technician may measure the reference magnitude $M_{REF}$ and the frequency offset $\Delta f_{REF}$ of the optical test signal 116 redirected (reflected) by the first wavelength-selective reflector 122 to propagate back to the test location 106, and store the reference magnitude $M_{REF}$ and the frequency offset $\Delta f_{REF}$ memory of the controller 126. During the subsequent monitoring, the controller 126 may perform a comparison between the determined magnitude M of the first returning optical test signal 117 and a reference magnitude $M_{REF}$ stored in the memory of the controller 126. The controller 126 may also perform a comparison between the determined modulation frequency offset $\Delta f$ of the first returning optical test signal 117 to a reference modulation frequency offset $\Delta f_{REF}$ stored in the memory of the controller 126.

Figure 2:
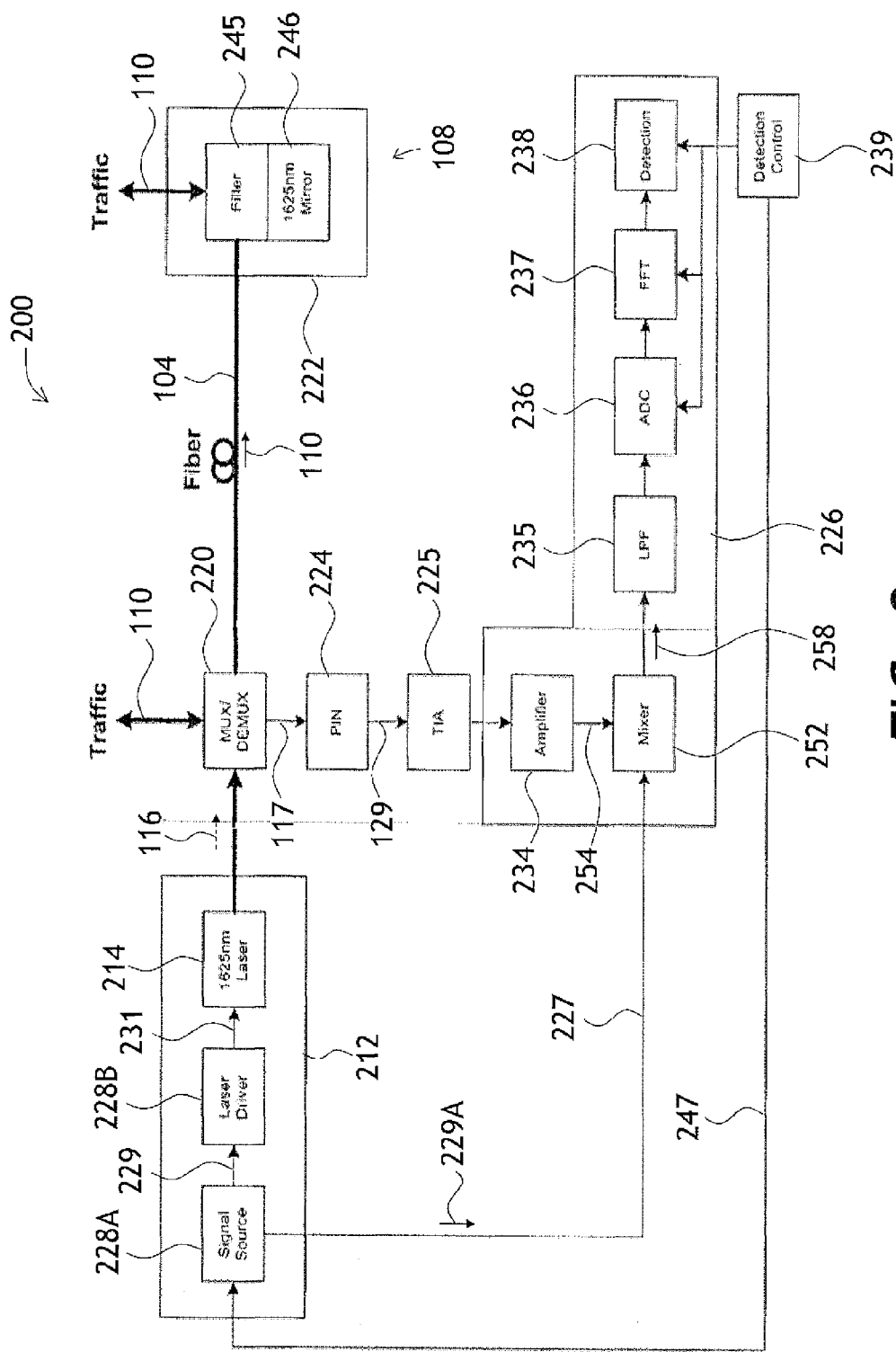
FIG. 2 illustrates a block diagram of an embodiment of the monitoring system of FIG. 1B.

Referring to FIG. 2, a system 200 for in-service monitoring the first fiberoptic link 104 is an illustrative embodiment of the system 100 of FIGS. 1A and 1B. The system 200 of FIG. 2 includes a transmitter 212, a WDM coupler 220 optically coupled to the transmitter 212, a photodiode 224 optically coupled to the WDM coupler 220, a transimpedance amplifier (TIA) 225 electrically coupled to the photodiode 224, a controller 226 electrically coupled to the TIA 225 and the transmitter 212. a detection control unit 239 electrically coupled to the controller 226, and a wavelength-selective reflector 222 optically coupled to the first remote location 108 of the first fiberoptic link 104. The transmitter 212 includes serially coupled a signal source 228A, a laser driver 228B, and a laser diode 214 emitting at the wavelength of 1625 nm in this illustrative example.

The signal source 228A provides a modulation signal 229 for modulating the laser driver 228B. The signal source 228A functions as a frequency ramp generator, preferably a linear frequency ramp generator. In other words, it is preferable that the modulation signal 229 have the modulation frequency $f_M$ periodically linearly ramped, or changing linearly with time e.g. in sawtooth-like fashion.

Figure 3A:
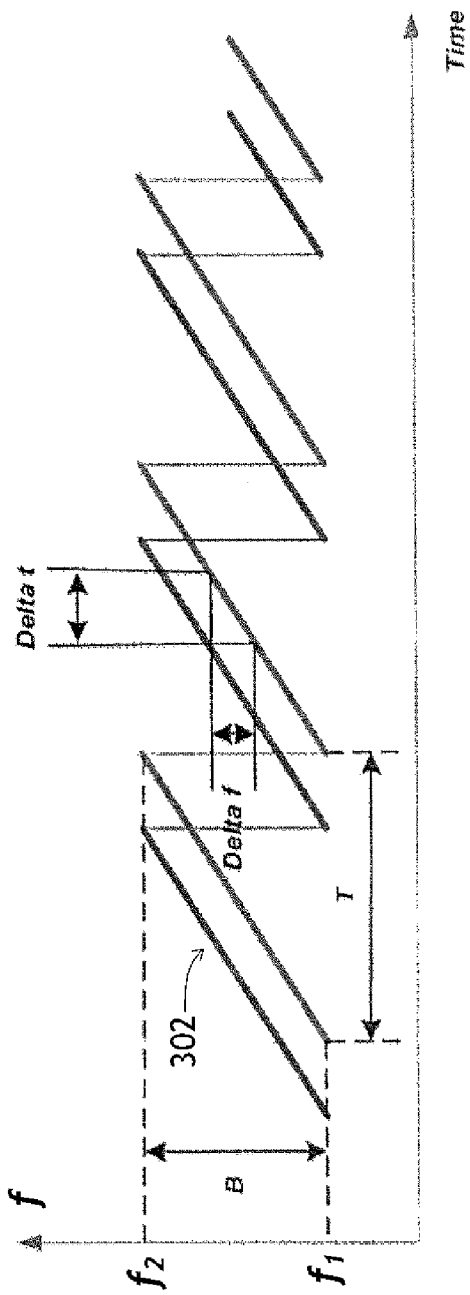
FIG. 3A illustrates a time dependence of a modulation frequency of a test signal according to a preferred embodiment, in which the modulation frequency is linearly ramped.
Figure 3B:
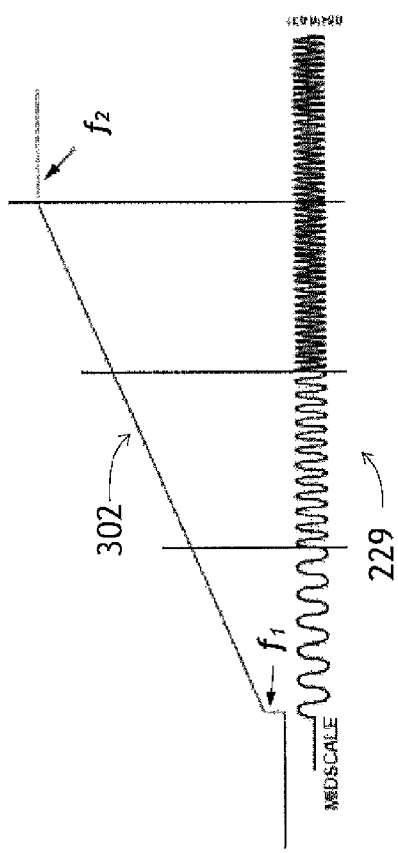
FIG. 3B illustrates a time dependence of the modulation amplitude when the modulation frequency is linearly ramped as shown in FIG. 3A.

Referring to FIGS. 3A and 3B, a time dependence 302 (FIG. 3A) of the modulation frequency f of the modulation signal 229 is shown. One can see that the modulation frequency f increases linearly in time from the first $f_1$ to the second $f_2$ modulation frequency, with a period T. A frequency sweeping range B (FIG. 3A) is equal to $f_2-f_1$. FIG. 3B illustrates a time dependence of the linearly frequency ramped modulation signal 229. In FIG. 3A. the modulation frequency $f_M$ is ramped linearly during each sweep period T. The frequency $f_M$ may also be periodically ramped down, or ramped up and then down, preferably in a linear fashion for simplified processing.

Referring back to FIG. 2, the modulation signal 229 may be applied to the laser driver 228B for providing a driving current 231 that is amplitude modulated with the linearly ramped modulation frequency f as explained above. As a result, the optical test signal 116 is amplitude modulated with linearly ramped modulation frequency f. Emission wavelength of the laser diode 214 may also be modulated in some types of the laser diode 214. The amplitude modulated optical test signal 116 is coupled to the WDM coupler 220. where it is multiplexed with the first information signal 110. Both signals 110 and 116 co-propagate in the first fiberoptic link 104 towards the wavelength-selective reflector 222.

The wavelength-selective reflector 222 may include an optical filter 245 and a mirror 246. In operation, the optical filter 245 directs the first information signal 110 towards its intended destination, not shown. The optical test signal 116 at the wavelength of 1625 nm in this example is reflected by the mirror 246 to propagate back through the first fiberoptic link 104 towards the WDM coupler 220, which is constructed to couple a reflected optical test signal 117 to the photodiode 224. The transimpedance amplifier 225 amplifies the photocurrent of the photodiode 224. The transimpedance amplifier 225 is usually disposed proximate the photodiode 224 to lower the noise figure.

In the embodiment shown in FIG. 2, the controller 226 includes an amplifier 234 and a mixer 252 electrically coupled together. In operation, the amplifier 234 amplifies a photocurrent 129 representing the reflected optical test signal 117, and provides an amplified output signal 254 to the mixer 252. A reference signal 229A obtained from the linearly frequency ramped modulation signal 229, e.g. a copy of the linearly frequency ramped modulation signal 229, is provided to the mixer 252 via a control line 227. The mixer 363 mixes the signals 254 and 229A, providing a signal 258 at a differential frequency, that is, the frequency offset Δf. Since the reflected optical test signal 117 is delayed relative to the reference signal 229A due to a finite speed of propagation of the optical test signal 116 and the reflected optical test signal 117 in the first fiberoptic link 104, the frequency offset Δf corresponds to a time offset Δt, as shown in FIG. 3A. Therefore, one may configure the controller 226 to determine a magnitude of the signal 258 at the frequency offset Δf, by obtaining a frequency spectrum of the mixed signal, and looking for peaks in the frequency spectrum. From the value of the frequency offset Δf and the corresponding time offset Δt, a distance to a reflective fault in the first fiberoptic link 104 may be determined.

In the embodiment shown in FIG. 2, the controller 226 further includes a low-pass filter (LPF) 235, an analog-to-digital converter (ADC) 236, a Fast Fourier Transform (FFT) unit 237, and a detection unit 238 serially electrically coupled together. In operation, the LPF 235 fillers the signal 258. which is then digitized by the ADC 236. The FFT unit 237 obtains the frequency spectrum of the signal 258. The frequency spectrum may then be analyzed by the detection unit 238 for peaks, to determine fiber breaks, loose connectors, transmittivity loss, etc. The detection control unit 239 performs general control of the test system 200, including scheduling, reporting, etc.

Figure 4:
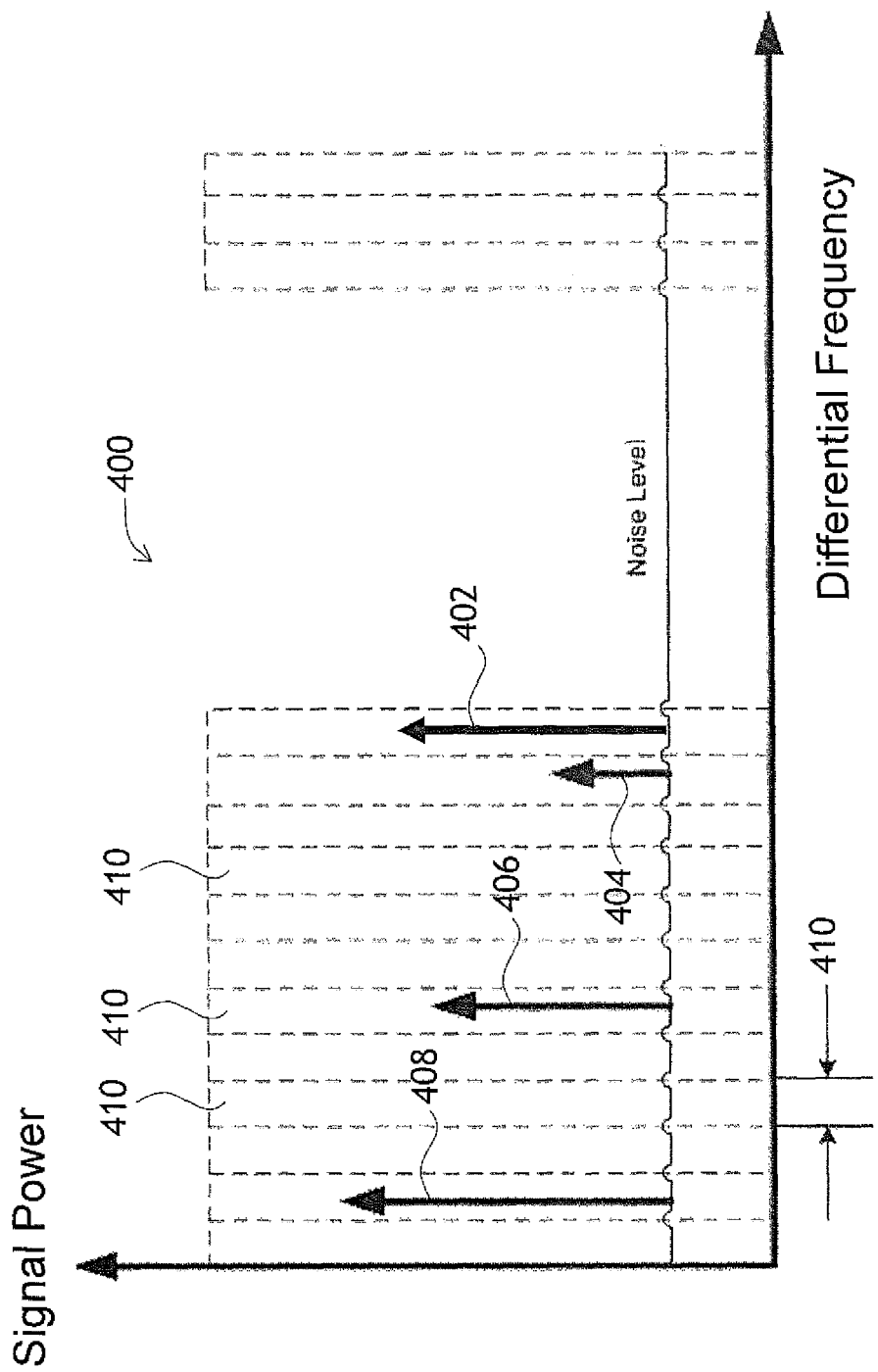
FIG. 4 illustrates a frequency spectrum of a returning test signal measured by the monitoring system of FIG. 2.

Turning to FIG. 4, an illustrative frequency spectrum 400 includes a reference peak 402 corresponding to the reflection of the optical test signal 116 from the wavelength-selective reflector 222, as well as three reflection peaks 404, 406, and 408 corresponding to open-fiber reflections of the optical test signal at distances of $d_1$, $d_2$ and $d_3$, respectively, from the test location 106 (FIG. 1A), where $d_1 > d_2 > d_3$. For data processing purposes, the entire frequency spectrum 400 may be broken down into "frequency bins" 410 shown in FIG. 4 with dashed rectangles. Bach frequency bin 410 corresponds to a certain distance from the test location 106. The detection unit 238 may be configured to search for peaks in each of the frequency bins 410, e.g. the reflection peaks 404, 406, and 408, thus determining the magnitudes of reflections, as well as distances from the test location 106, at which these reflections occur. This opens up a possibility of detection a fault such as fiber breakage. In other words, by measuring the magnitude of the differential frequency signal 258 in each frequency bin 410, one can effectively determine an optical power level of the reflected optical test signal 117, which has been reflected from a fiber segment of the first fiberoptic link 104 corresponding to each frequency bin 410. The reflections detected in a particular fiber segment may indicate a fiber breakage in that segment.

The magnitude and the frequency offset of reference peak 402 provide the reference magnitude $M_{REF}$ and the reference frequency offset $\Delta f_{REF}$, which may then be used as references for magnitudes M and frequency offsets Δf of the reflection peaks 404, 406, and 408. In other words, the magnitudes M and the frequency offsets Δf of the reflection peaks 404, 406, and 408 may be determined in relation to, e.g. as a percentage of the reference magnitude $M_{REF}$ and the reference frequency offset $\Delta f_{REF}$, respectively. For instance, a mere deterioration of the transmission of the first fiberoptic link 104 may be determined based on the detected magnitude of the reflected optical test signal 117 at the reference frequency offset $\Delta f_{REF}$.

Figure 5A:
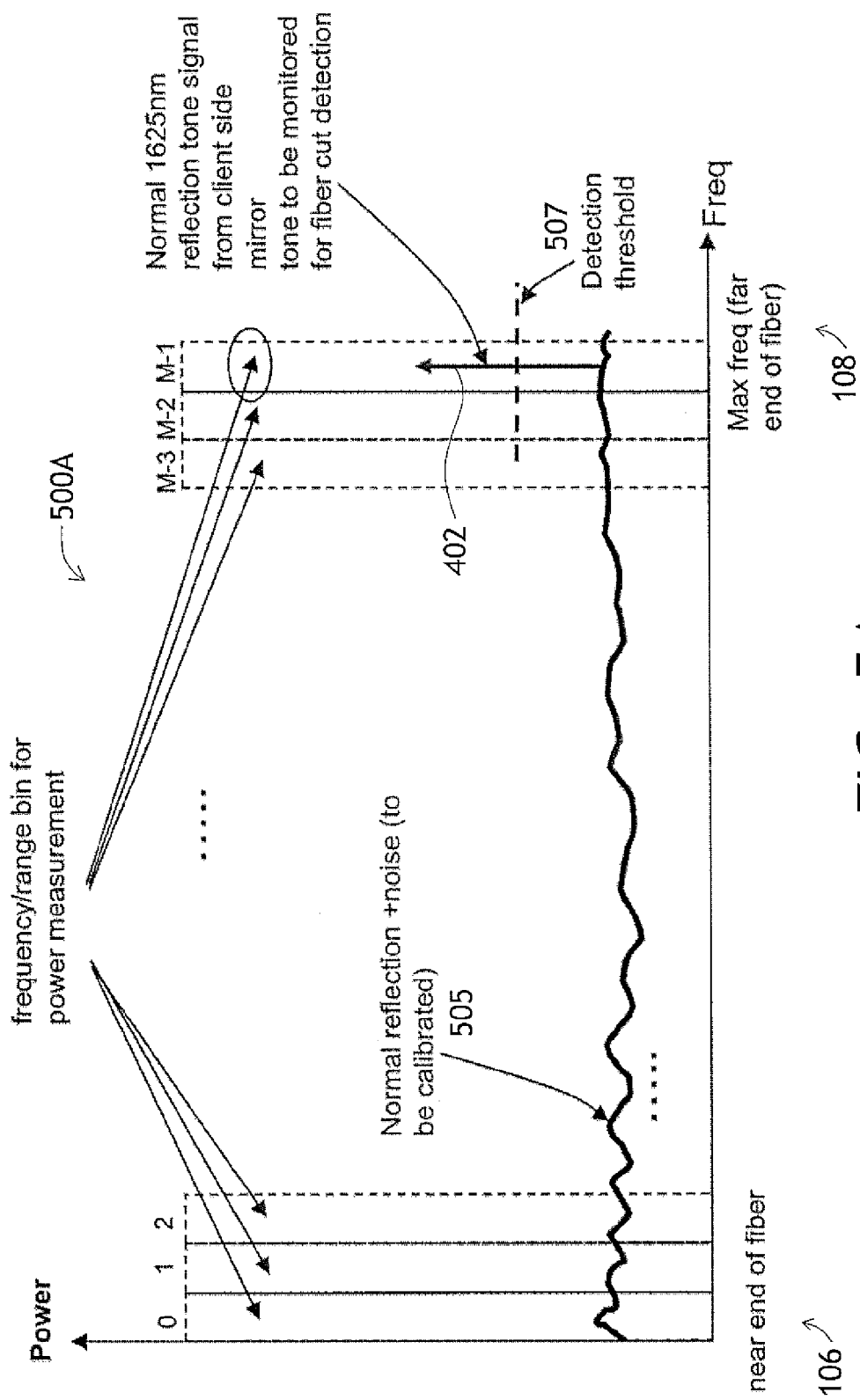
FIG. 5A illustrates a frequency spectrum of a returning test signal during normal operation of the fiberoptic link being monitored.

Referring to FIG. 5A, a modulation frequency spectrum 500A of the reflected optical test signal 117 corresponds to a normal operation of the first fiberoptic link 104, that is, when no fiber breaks or transmission deterioration are present in the first fiberoptic link 104. A noise floor 505 shows no pronounced peaks, indicating that no anomalous reflections are present. The reference peak 402 has the reference magnitude $M_{REF}$, indicating that no transmission deterioration is present. In one embodiment, the detection unit 238 of the controller 226 is configured to determine that a deterioration has occurred in the first fiberoptic link when the magnitude $M_{REF}$ of the first returning optical signal 117 at the reference modulation frequency offset $\Delta f_{REF}$ is less than a pre-defined threshold 507.

Figure 5B:
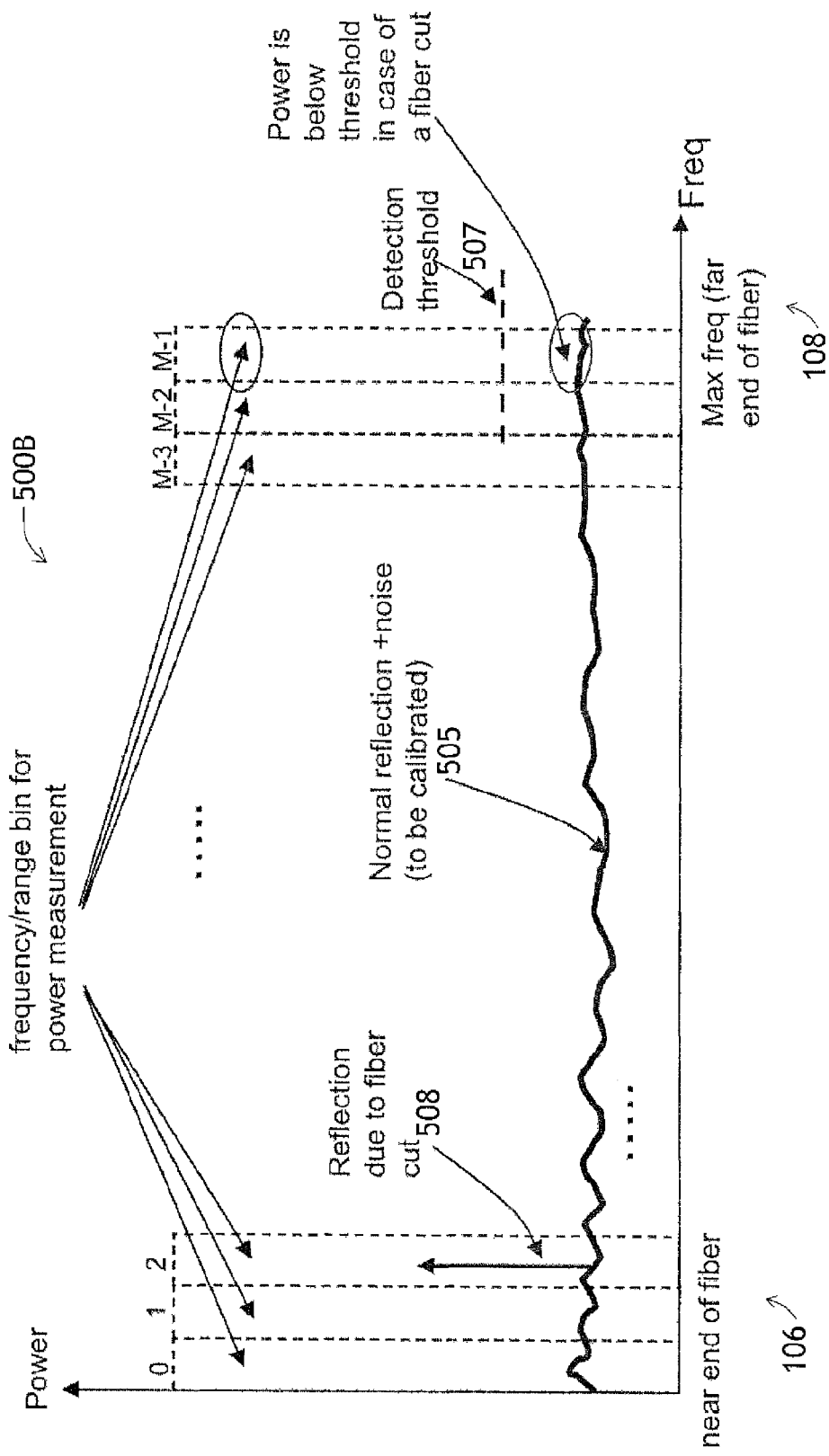
FIG. 5B illustrates a frequency spectrum of a returning test signal upon detecting an open fiber in the fiberoptic link being monitored.

Turning to FIG. 5B, a modulation frequency spectrum 500B of the reflected optical test signal 117 corresponds to a case when a fiber break has occurred in the first fiberoptic link 104 between the first wavelength-selective reflector 122 installed at the first remote location 108, at the test location 106. The fiber break caused the optical test signal 116 to partially reflect from the fiber break point. Since the location of the reflection is closer than the location of the first wavelength-selective reflector 122, the modulation frequency offset Δf of the first returning optical test signal 117 is smaller than the reference modulation frequency offset $\Delta f_{REF}$. Accordingly, a reflection peak 508 has the modulation frequency offset Δf smaller than $\Delta f_{REF}$. The detection unit 238 of the controller 226 may be configured for determining that the fiber break or cut has occurred in the first fiberoptic link 104 when the modulation frequency offset Δf of the first returning optical test signal 117 is smaller than the reference modulation frequency offset $\Delta f_{REF}$. As explained above, the location of the break or cut may be determined from the magnitude of the modulation frequency offset Δf.

The monitoring system 200 has been used in an experiment aimed at locating an "open" or a broken or cut fiber in the first fiberoptic link 104. The first fiberoptic link 104 has been simulated with 1 m long ("0 km fiber"). 10 km long, 25 km long, 35 km long, and 50 km long spans of an optical fiber. The data traffic at the center wavelength of 1530 nm, corresponding to the first information signal 110, was propagated in the fiber spans of different lengths together with a tone at 1625 nm, corresponding to the optical test signal 116. For each one of the fiber span lengths, two tests were performed, one with an open connector and one with the wavelength-selective reflector 222 optically coupled at the end of each fiber span. A frequency sweep range of B=5 MHz over a sweeping time period of about 2 ms, and a frequency bin size of about 5 kHz were used. The results of testing are summarized in the following Tables 1 and 2. In Table 3, the experimental data are organized in rows corresponding to different fiber span lengths. In Table 2, the experimental data are organized in rows corresponding to the optical power levels detected.

TABLE 1

|  | Test Condition | Rx power (dBm) | Tone frequency (MHz) | Calculated distance (km) |
|---|---|---|---|---|
| 50 km fiber | With reflector 222 | −34.9 | 1.259 | 51.35 |
|  | Open connector | −42.9 | (tone is below noise floor) | N/A |
| 35 km fiber | With reflector 222 | −28.2 | 0.894 | 36.46 |
|  | Open connector | −40.1 | 0.898 | 36.63 |
| 25 km fiber | With reflector 222 | −24.1 | 0.63 | 25.7 |
|  | Open connector | −36.6 | 0.63 | 25.7 |
| 10 km fiber | With reflector 222 | −17 | 0.264 | 10.77 |
|  | Open connector | −30 | 0.264 | 10.77 |
| 0 km fiber | With reflector 222 | −12.2 | 0 | 0 |
|  | Open connector | −25.9 | 0 | 0 |

TABLE 2

| Optical Power | 50 km fiber | 35 km fiber | 25 km fiber | 10 km fiber | 0 km fiber |
|---|---|---|---|---|---|
| Optical power with reflector 222 (dBm) | −34.9 | −28.2 | −24.1 | −17 | −12.2 |
| Open connector optical power (dBm) | −42.9 | −40.1 | −36.6 | −30 | −25.9 |
| Optical power difference (dB) | 8 | 11.9 | 12.5 | 13 | 13.7 |
| Tone power difference (dB) | 16 | 23.8 | 25 | 26 | 27.4 |
| Detection margin (dB) | +/−8 | +/−12 | +/−12.5 | +/−13 | +/−13.7 |

In Table 2, the "Tone power difference" corresponds to the difference in the optical power levels of the returning optical test signal 117. One can see that the detection margin of +/−8 dB may be provided for fiber spans as long as 50 km.

Figure 6:
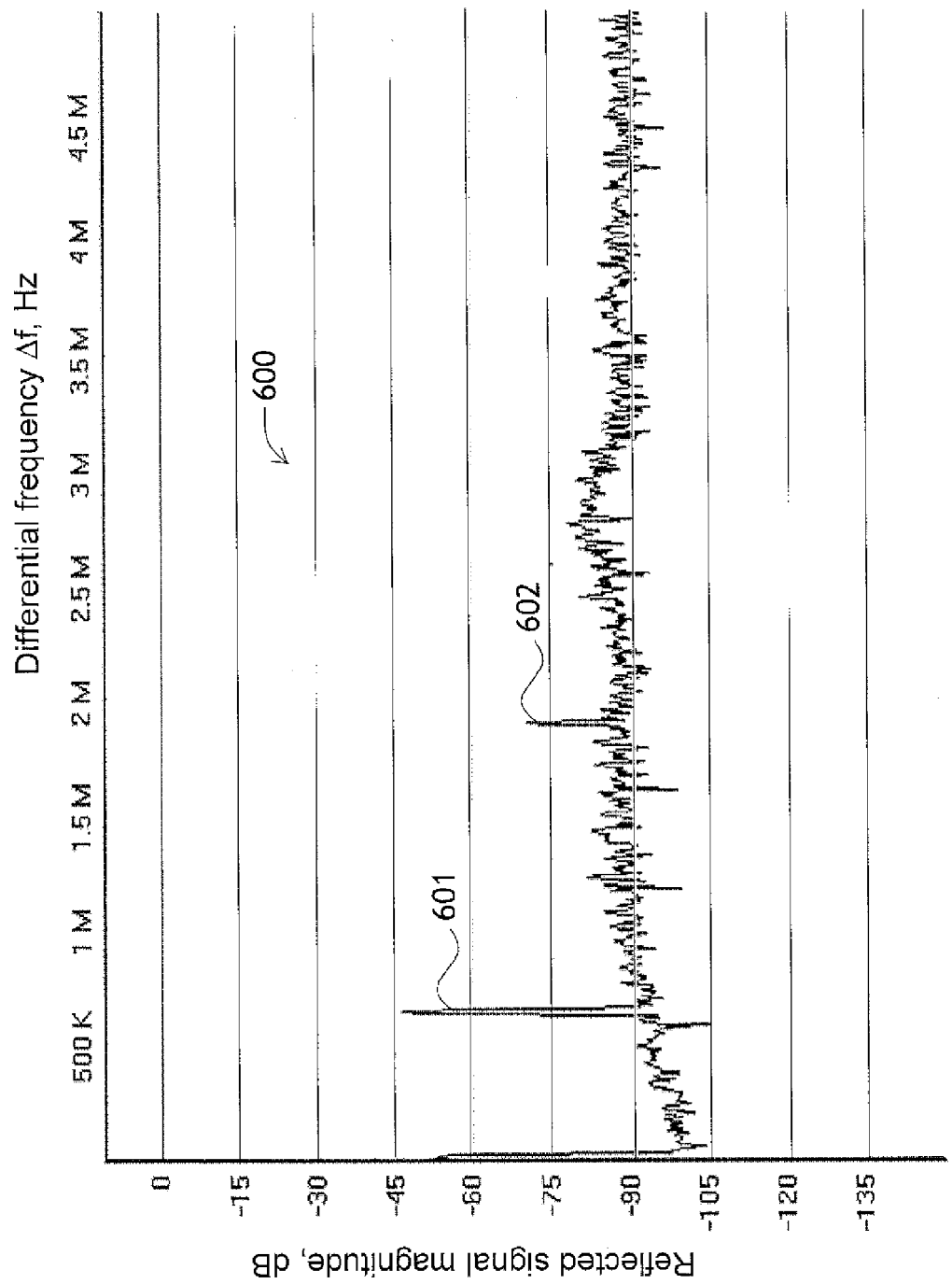
FIG. 6 illustrates an example of a frequency spectrum of a returning signal measured by the system of FIG. 2.

Referring to FIG. 6, a typical measured differential modulation frequency spectrum 600 of the first returning optical test signal 117 is shown. Peak 601 at differential frequency of 630 KHz corresponds to reflections along the first fiberoptic link 104 from the wavelength-selective reflector 222. The modulation frequency/has been ramped from 15 MHz to 20 MHz in this example. In one embodiment, the light source 112 has a peak optical power of no greater than 5 mW, to avoid impacting normal functioning of the fiberoptic network 102 (FIG. 1A). Also in one embodiment, a difference between the second $f_2$ and first $f_1$ modulation frequencies, that is, the modulation frequency ramp amplitude B (FIG. 3A) is at least 5 MHz. The optical test signal 116 may be amplitude modulated at no less than 80% modulation index.

Figure 7:
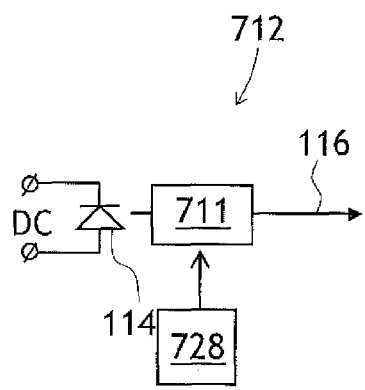
FIG. 7 illustrates a block diagram of an embodiment of a modulated light source of the monitoring system of FIG. 1B.

Turning to FIG. 7 with further reference to FIG. 1B, an embodiment 712 (FIG. 7) of the transmitter 112 (FIG. 1B) includes the light source 114 (FIG. 7) and an electro-optical modulator 711 optically coupled to the light source 114. The light source 114 is energized by a DC current supply. In this embodiment, a linear frequency ramp generator 728 may be operationally coupled to the electro-optical modulator 711 for modulating at least one of an amplitude, frequency and a phase of the optical test signal 116. The linear frequency ramp generator 728 may provide a reference signal to the controller 126 (FIG. 1B), or the reference signal 229A to the mixer 252 of the controller 226 of the monitoring system 200 (FIG. 2).

Figure 8:
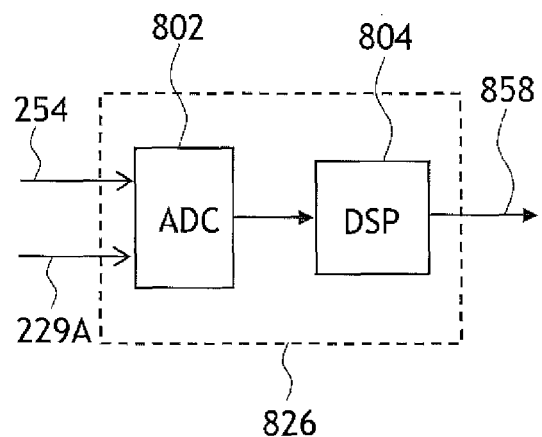
FIG. 8 illustrates a block diagram of an embodiment of a digital mixer of the monitoring system of FIG. 1B.

Referring again to FIG. 2, the mixer 252 may be analog or digital. Turning to FIG. 8 with further reference to FIG. 2, a fully digital controller embodiment 826 (FIG. 8) may include an analog to digital converter 802 for digitizing the amplified output signal 254 of the first photodiode 224 (FIG. 2) and the signal 229A at the linearly ramped modulation frequency, to obtain respective digitized signals, and a digital signal processing (DSP) unit 804 for mixing the digitized signals to obtain a digitized test signal 858 at the differential frequency $\Delta f$.

Figure 9:
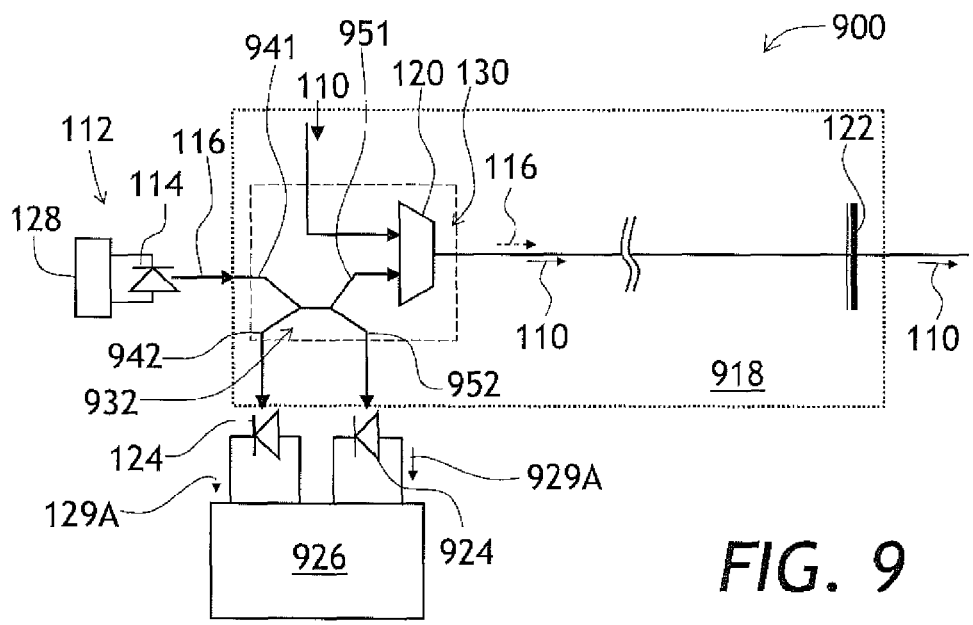
FIG. 9 illustrates a block diagram of an embodiment of a monitoring system having a reference photodiode.

Turning to FIG. 9 with further reference to FIG. 1B, a monitoring system 900 of FIG. 9 is an embodiment of the monitoring system 100 of FIG. 1B. Below, only differences between the monitoring systems 900 and 100 are described. An optical splitter 932 of the monitoring system 900 (FIG. 9) includes first 941 and second 942 input ports and first 951 and second 952 output ports. A first test channel 918 of the monitoring system 900 further includes a reference photodetector 924 optically coupled to the second output port 952 for defecting a portion of the optical test signal 116 coupled to the first fiberoptic link 104 at the test location 106, so as to obtain a reference signal 929A.

A controller 926 of the monitoring system 900 may further include a mixer, not shown, tor mixing a photocurrent 129A generated by the first signal photodetector 124 with the reference signal 929A to obtain a signal at the differential frequency, or the modulation frequency offset $\Delta f$. The controller 926 may further be configured for determining the magnitude $M(\Delta f)$ of the returning optical test signal 117 at the differential frequency $\Delta f$, and a value of the differential frequency $\Delta f$.

Figure 10:
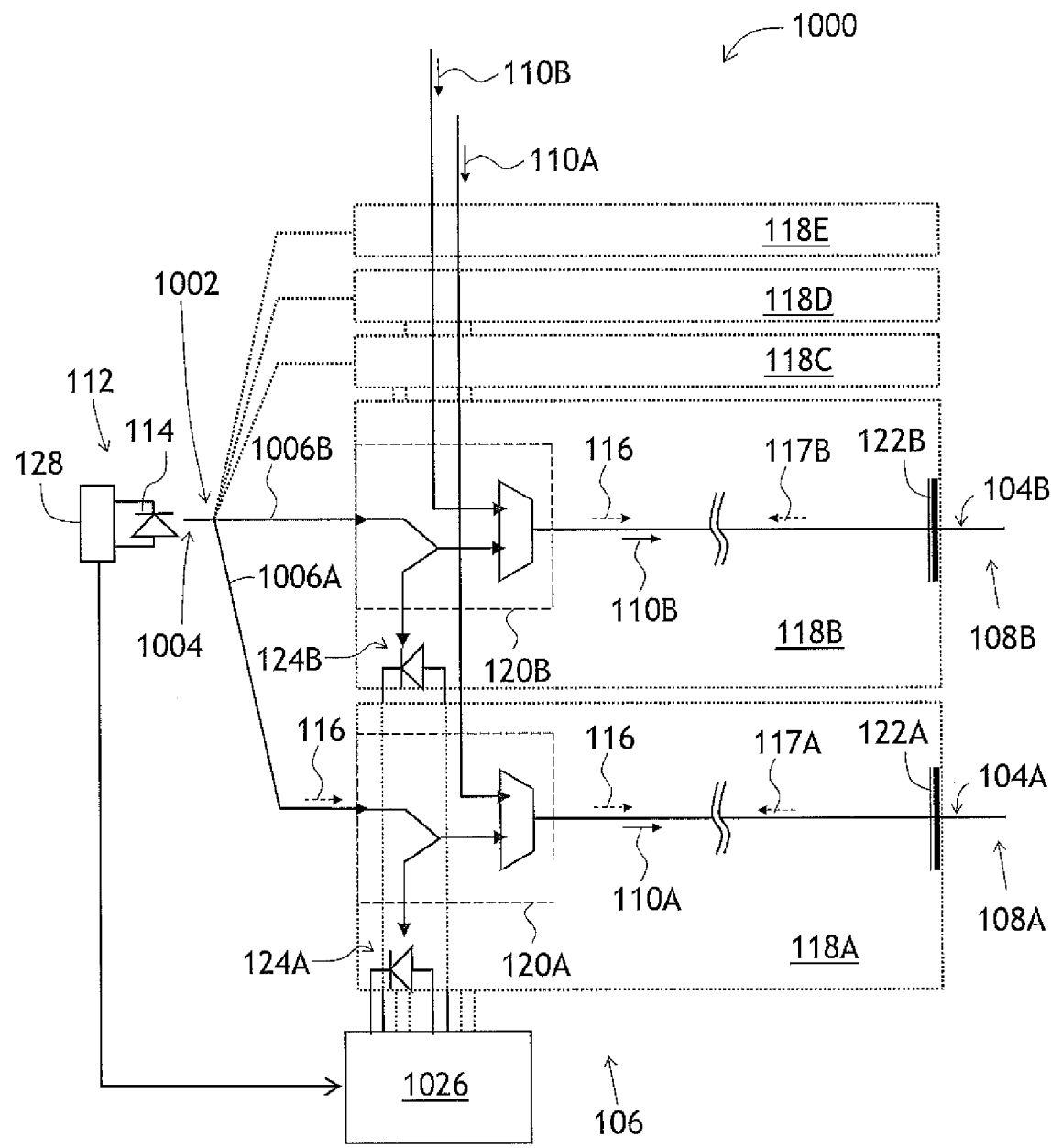
FIG. 10 illustrates a block diagram of a multi-channel embodiment of a monitoring system.

The system 100 of FIGS. 1A and 1B, 200 of FIG. 2, and 900 of FIG. 9 may be expanded to accommodate in-service monitoring of other fiberoptic links of the fiberoptic network 102. Referring to FIG. 10, the fiberoptic network 102 includes a first fiberoptic link 104A spanning between the test location 106 and a first remote location 108A, and a second fiberoptic link 104B spanning between the test location 106 and a second remote location 108B. The first fiberoptic link 104A carries a first information signal 110A at a first wavelength between the test location 106 and the first remote location 108A. and the second fiberoptic link 104B carries a second information signal 110B at a second wavelength between the test location 106 and the second remote location 108B.

To monitor the first fiberoptic link 104A, one embodiment of a multi-channel monitoring system 1000 includes a first test channel 118A. which is similar to the first test channel 118 of the system 100 of FIGS. 1A and 1B. Briefly, the first test channel 118A includes a first coupler 120A for optically coupling the light source 114 to the first fiberoptic link 104A at the test location 106, for causing the optical test signal 116 to propagate along the first fiberoptic link 104A towards the first remote location 108A. A first wavelength-selective reflector 122A is provided for optically coupling into the first fiberoptic link 104A at the first remote location 108A, for redirecting the optical test signal 116 to propagate back to the first coupler 120A at the test location 106, while propagating the first information signal 110A. A first signal photodctector 124A is optically coupled to the first coupler 120A for detecting a first returning optical test signal 117A propagating in a direction from the first remote location 108A towards the first coupler 120A.

To monitor the second fiberoptic link 104B, the system 1000 further includes a second test channel 118B similar to the first test channel 118A. The second test channel 118B may include a second coupler 120B for optically coupling the light source 114 to the second fiberoptic link 104B at the test location 106, for causing the optical test signal 116 to propagate along the second fiberoptic link 104B towards the second remote location 108B. A second wavelength-selective reflector 122B may be provided for optically coupling into the second fiberoptic link 104B at the second remote location 108B, for redirecting the optical test signal 116 to propagate back to the second coupler 120B at the test location 106, while propagating the second information signal 110B. A second signal photodetector 124B may be optically coupled to the second coupler 120B for detecting a second returning optical test signal 117B propagating in a direction from the second remote location 108B towards the coupler 120B.

In the embodiment shown, the system 1000 further includes a test signal splitter 1002 having an input port 1004 and first 1006A and second 1006B output ports. The input port 1004 is optically coupled to the light source 114 of the transmitter 112, the first output port 1006A is optically coupled to the first coupler 120A of the first test channel 118A, and the second output 1006B port is optically coupled to the second coupler 120B of the second test channel 118B.

A controller 1026 of the system 1000 is similar to the controller 126 of the system 100 of FIGS. 1A and 1B. The controller 1026 of the system 1000 is operationally coupled to first and second test channels 118A and 118B. Specifically, the controller 1026 is coupled the first signal photodetector 124A and the second signal photodetector 124B and configured for determining magnitudes $M_B$ and $M_B$ of the first and second returning optical test signals 117A and 117B, respectively, and determining modulation frequency effects $\Delta f_A$ and $\Delta f_B$ of the first and second returning optical test signals 117A and 117B, respectively, relative to a current value of the periodically swept modulation frequency f. The controller 1026 may also be configured for determining a fault in the first and second fiberoptic links 104A/B based on the determined magnitudes $M_B$ and $M_B$ and the determined modulation frequency offsets $\Delta f_A$ and $\Delta f_B$ of the first and second returning optical test signals 117A and 117B, respectively. The system 1000 may further be upgraded or expanded to include similar test channels 118C, 118D, 118E, etc. for in-service monitoring other fiberoptic links as these are added to the fiberoptic network 102. The controller 1026 may be time-shared.

Several non-limiting, illustrative implementations of the system 100 of FIGS. 1A and 1B, 200 of FIG. 2, 900 of FIG. 9, and 1000 of FIG. 10 will now be considered.

Figure 11A:
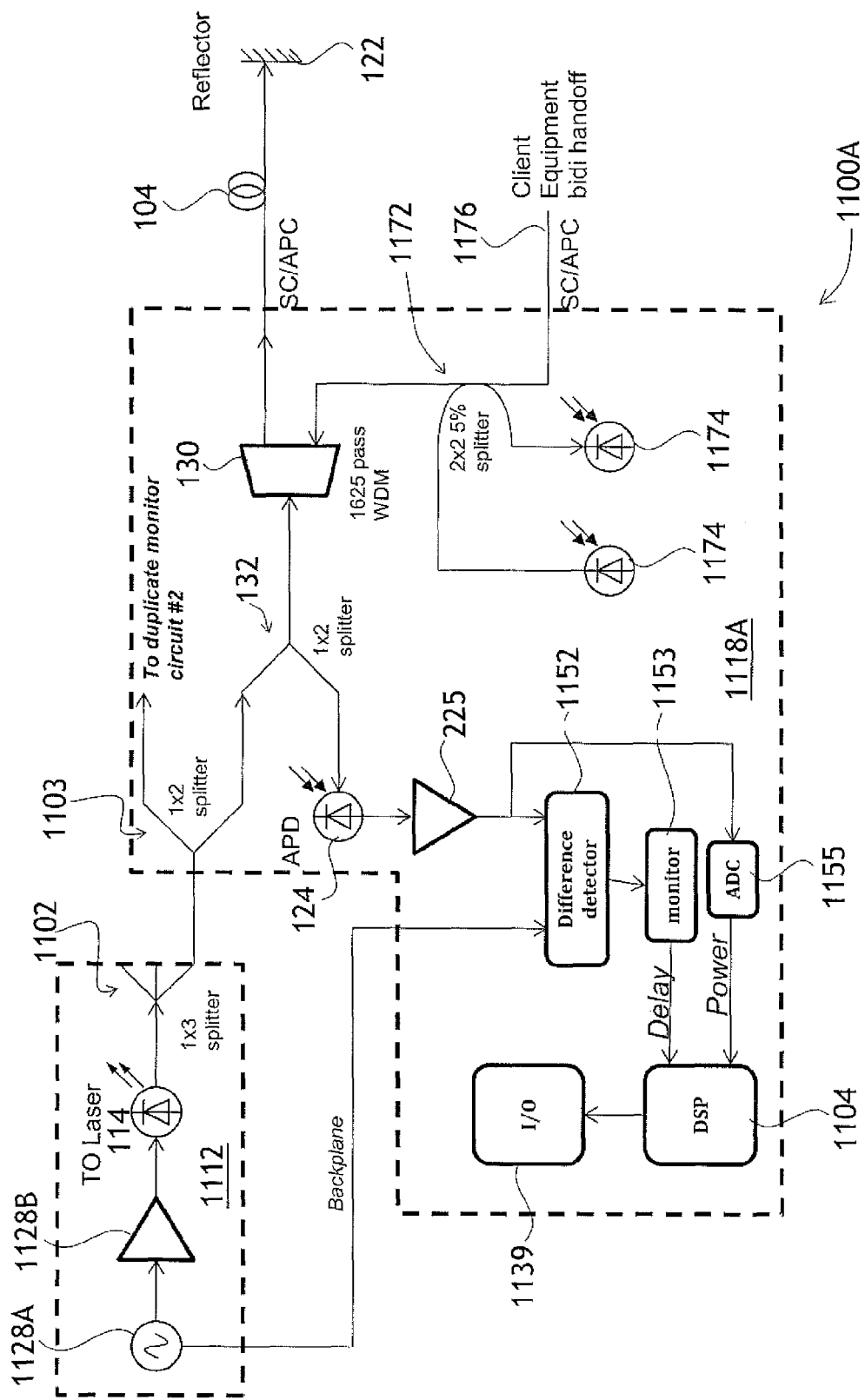
FIGS. 11A to 11D illustrate block diagrams of various illustrative embodiments of the monitoring systems of FIG. 1B, FIG. 9.

Referring to FIG. 11A, a system 1100A for in-service monitoring of the first fiberoptic link 104 may include a modulated light source 1112 and a test channel 1118A. The modulated light source 1112 may include serially electrically coupled a linear frequency ramp generator 1128A, a laser driver 1128B, and the light source 114. Function of these elements is similar to that of the system 200 of FIG. 2, specifically the signal source 228A, the laser driver 228B, and the laser diode 214. An optical splitter 1102 may be provided for future addition of test channels.

Still referring to FIG. 11A, the test channel 1118A of the system 1100A of FIG. 11A includes similar elements as the test channel 118 of the system 100 of FIGS. 1A and 1B, specifically the WDM 130, the optical splitter 132, the first signal photodetector 124, preferably an avalanche photodiode (APD). The TIA 225 may be provided to boost signal to noise ratio. An additional 1×2 coupler 1103 may be provided for coupling another test channel, not shown. An additional 2×2 coupler 1172 optically coupled to a pair of photodiodes 1174 may be provided for passively measuring power levels of $\lambda_1$, the upstream bidirectional customer data being connected via an optical connector 1176.

One distinctive feature of the first test channel 1118A is that the test channel 1118A includes an internal signal processing circuitry including a difference detector 1152, a time delay $\Delta t$/distance computation unit 1153, and a power determination unit 1155 coupled to a DSP unit 1104 for performing comparison with corresponding reference values provided by a test signal reflecting from the wavelength-selective reflector 122. Finally, an input/output circuit 1139 is provided for interfacing with external circuitry, not shown, for reporting link status/abnormal condition(s) detected.

Figure 11B:
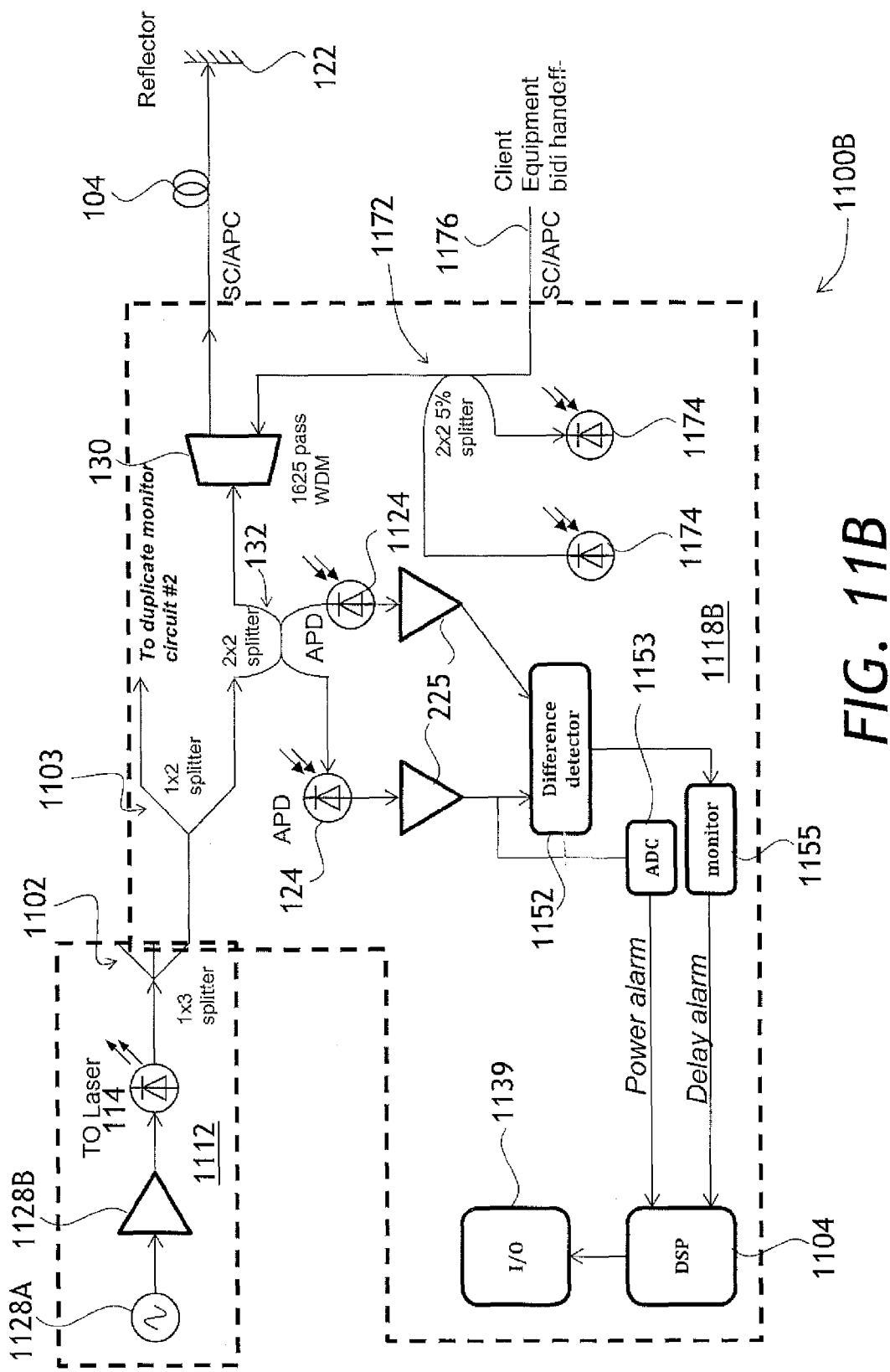

Turning to FIG. 11B, a system 1100B for in-service monitoring of the first fiberoptic link 104 is similar to the system 1100A of FIG. 11A. One distinctive feature of the system 1100B of FIG. 11B, as compared with the system 1100A of FIG. 11A, is that a test channel 1118B of the system 1100B of FIG. 11B includes a reference photodetector 1124 for providing a reference electrical signal, similarly to the reference photodetector 924 of the monitoring system 900 of FIG. 9.

Figure 11C:
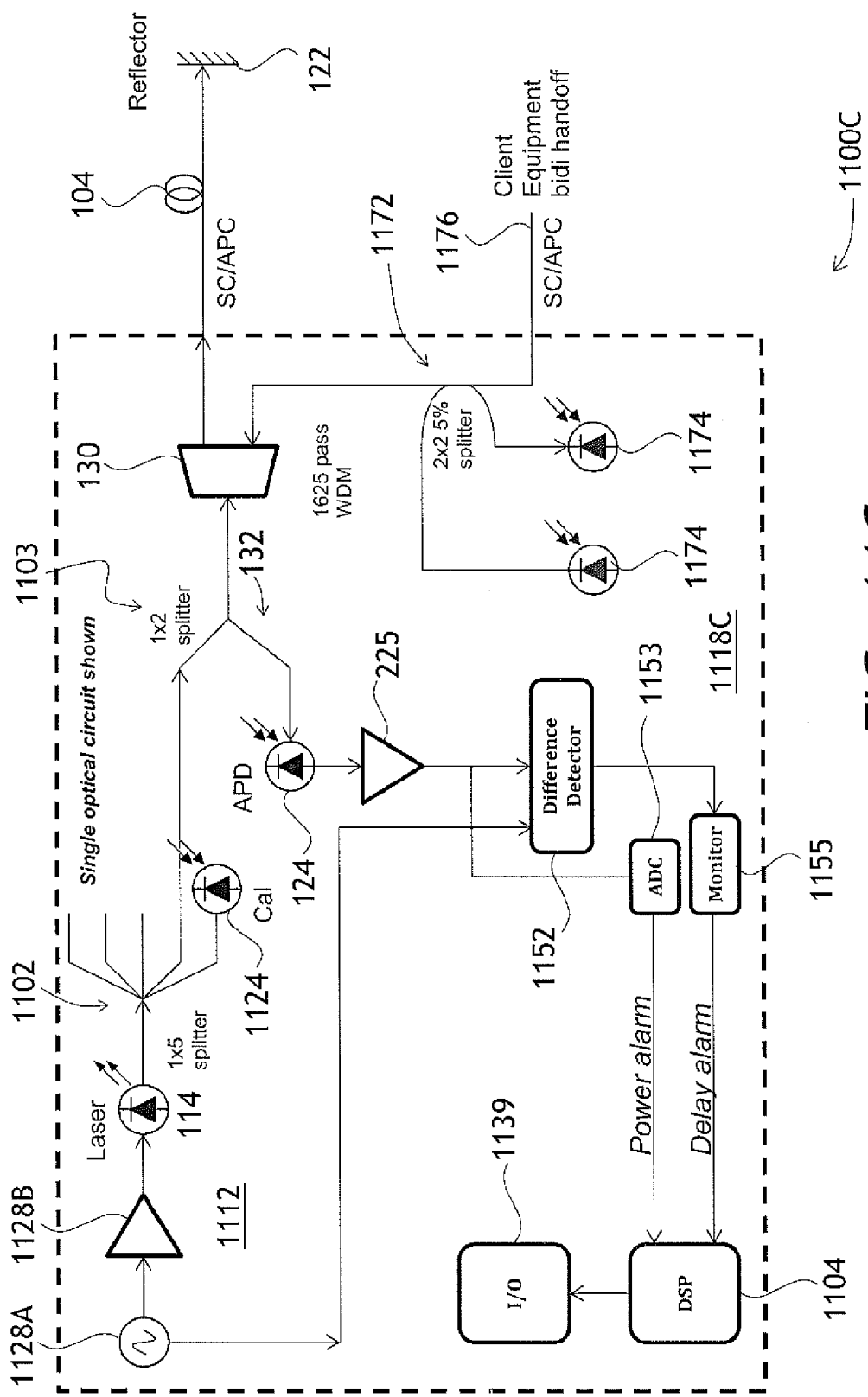

Referring now to FIG. 11C, an system 1100C for in-service monitoring of the first fiberoptic link 104 is similar to the system 1100B of FIG. 11B. One distinctive feature of the system 1100C of FIG. 11C. as compared with the system 1100B of FIG. 11B. is that the modulated light source 1112 is integrated into a test channel 1118C. This allows the reference photodetector 1124 to be coupled to the optical splitter 1102. simplifying overall construction.

Figure 11D:
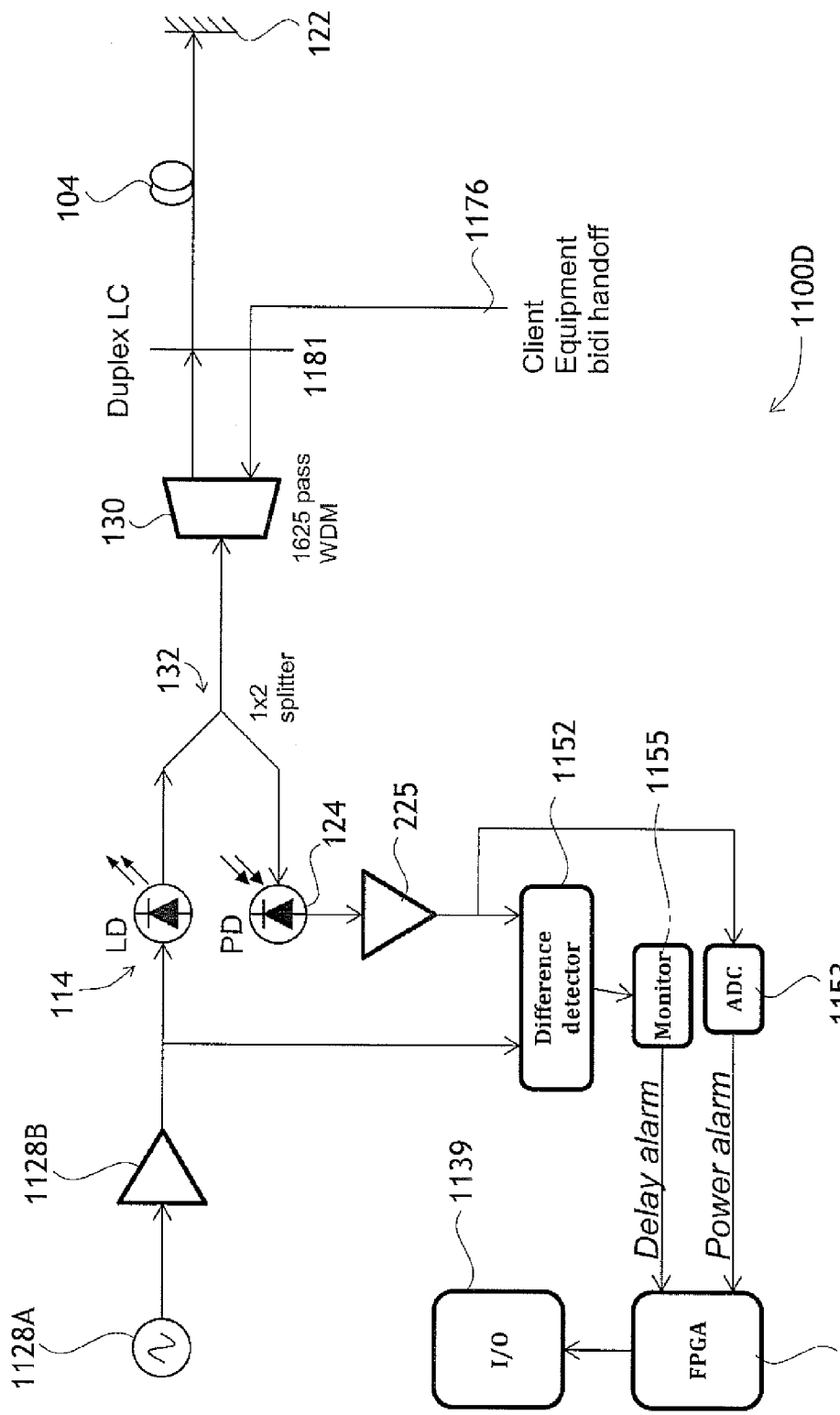

Turning to FIG. 11D, a system 1100D for in-service monitoring of the first fiberoptic link 104 is similar to the system 1100C of FIG. 11C. The system 1100D of FIG. 11D is further integrated into a single, standalone unit. In this embodiment, the light source 114 is directly optically coupled to a single splitter 132 and a single WDM 130. The DSP unit 1104 may be implemented in field-programmable gate array (FPGA). System 1100D may be implemented as a single small form pluggable (SFP) package, providing considerable cost and space savings.

Figure 12:
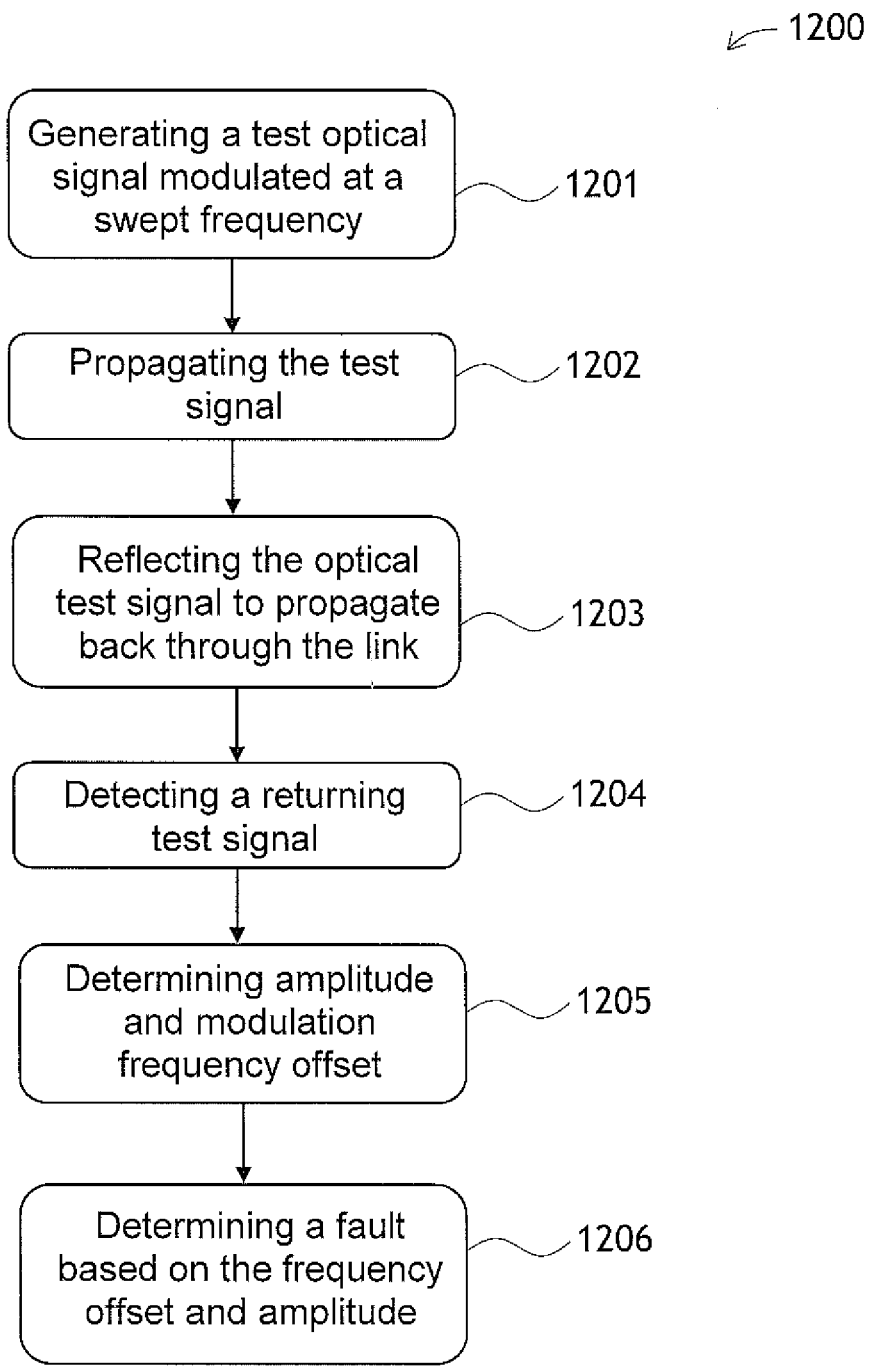
FIG. 12 illustrates a flow chart of a method embodiment for in-service monitoring a fiberoptic network.

Referring to FIG. 12 with further reference to FIGS. 1A and 1B, a method 1200 for in-service monitoring of the fiberoptic network 102 may be provided according to one embodiment. The method 1200 includes a step 1201 of generating the optical test signal 116 at the test wavelength $\lambda_T$ different from the first wavelength $\lambda_1$. The optical test signal 116 is modulated at a modulation frequency f periodically swept at the sweep period T from the first modulation frequency $f_1$ to the second modulation frequency $f_2$. In a preferred embodiment, the modulation frequency f is ramped linearly between the first modulation frequency $f_1$ and the second modulation frequency $f_2$ during each sweep period T.

In a next step 1202, the optical test signal 116 is optically coupled to the first fiberoptic link 104 at the test location 106. thereby causing the optical test signal 116 to propagate along the first fiberoptic link 104 to the first remote location 108. In a next step 1203, the wavelength-selective reflector 122 disposed at the first remote location 108 is used to redirect the optical test signal 116 to propagate back towards the test location 106, while propagating the first information signal 110 through the wavelength-selective reflector 122. In a next step 1204, the returning optical test signal 117 at the test wavelength $\lambda_T$ is detected.

In a next step 1205, the magnitude M of the returning optical test signal 117 the modulation frequency offset $\Delta f$ of the returning optical test signal 117 is detected, and is compared to the current value of the periodically swept modulation frequency. Finally, in a step 1206, a fault in the first fiberoptic link 104 is detected based on the determined magnitude M and the determined modulation frequency offset $\Delta f$ of the returning optical test signal 117. The detection step 1206 may include comparing the determined magnitude M and the determined modulation frequency offset Δf to a reference magnitude $M_{REF}$ and a reference modulation frequency offset $\Delta f_{REF}$, respectively, of the optical test signal 117 redirected by the wavelength-selective reflector 122 in the reflecting step 1203, as explained above.

In one embodiment, the detection step 1206 may include determining that a fiber break has occurred in the first fiberoptic link 104 when the modulation frequency offset Δf of the returning optical test signal 117 is smaller than the reference modulation frequency offset $\Delta f_{REF}$. Furthermore in one embodiment, the detection step 1206 may include determining that a deterioration has occurred in the fiberoptic link when the magnitude M of the returning optical signal at the reference modulation frequency offset is less than the reference magnitude $M_{REF}$. To ensure that the first information signal 110 at the first wavelength $\lambda_1$ is not perturbed during transmission, the optical test signal 116 may have a peak optical power of no greater than 1 mW. Furthermore in one embodiment, the first fiberoptic link 104 may carry a second information signal at a second wavelength $\lambda_2$ from the remote location 108 to the test location 106. The second wavelength $\lambda_2$ is typically different from the first wavelength $\lambda_1$. The test wavelength is different from both the first wavelength $\lambda_1$ and the second wavelength $\lambda_2$.

The hardware used to implement the various illustrative logics, logical blocks, modules, and circuits described in connection with the aspects disclosed herein may be implemented or performed with a general purpose processor, a digital signal processor f DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
a controller configured to:
determine a magnitude of a returning optical test signal;
determine a modulation frequency offset of the returning optical test signal relative to a current value of a periodically swept modulation frequency; and
detect fault information in a fiberoptic link based on a comparison of at least one of:
the determined magnitude of the returning optical test signal and a reference magnitude of an optical test signal redirected by a wavelength-selective reflector; or
a comparison between the determined modulation frequency offset of the returning optical test signal to a reference modulation frequency offset of the optical test signal.

2. The system of claim 1, further comprising:
a photodetector to detect the returning optical test signal.

3. The system of claim 1, where the controller is further configured to:
detect, based on the determined modulation frequency offset of the returning optical test signal being less than the reference modulation frequency offset of the optical test signal, that there is a break in the fiberoptic link.

4. The system of claim 1, where the controller is further configured to:
detect, based on the determined magnitude of the returning optical test signal being less than the reference magnitude of the optical test signal, that there is a deterioration in the fiberoptic link.

5. The system of claim 1, where the wavelength-selective reflector is optically coupled to the fiberoptic link.

6. The system of claim 1, where
the wavelength-selective reflector is configured to redirect the optical test signal at a first wavelength, and
the first wavelength is a test wavelength.

7. The system of claim 6, where the wavelength-selective reflector is configured to propagate an information signal, at a second wavelength, to an antenna.

8. The system of claim 1, where
the returning optical test signal is a first returning optical test signal,
the fiberoptic link is a first fiberoptic link, and
controller is further configured to:
determine a magnitude of a second returning optical test signal;
determine a modulation frequency offset of the second returning optical test signal relative to a current value of a periodically swept modulation frequency; and
detect fault information in a second fiberoptic link.

9. The system of claim 8, where the controller, when detecting the fault information in the second fiberoptic link, is configured to:
detect the fault information in the second fiberoptic link, based on a comparison of at least one of:
the determined magnitude of the second returning optical test signal and the reference magnitude of the optical test signal; or
a comparison between the determined modulation frequency offset of the second returning optical test signal to a reference modulation frequency offset of the optical test signal.

10. The system of claim 1, where the returning optical test signal is based on a test signal that is modulated at the periodically swept modulation frequency.

11. A method comprising:
determining, by a controller, a magnitude of a returning optical test signal;
determining, by the controller, a modulation frequency offset of the returning optical test signal relative to a current value of a periodically swept modulation frequency; and detecting, by the controller, fault information in a fiberoptic link based on a comparison of at least one of:
- the determined magnitude of the returning optical test signal and a reference magnitude of an optical test signal redirected by a wavelength-selective reflector; or
- a comparison between the determined modulation frequency offset of the returning optical test signal to a reference modulation frequency offset of the optical test signal.

12. The method of claim 11, further comprising:
detecting the returning optical test signal.

13. The method of claim 11, further comprising:
detecting, based on the determined modulation frequency offset of the returning optical test signal being less than the reference modulation frequency offset of the optical test signal, that there is a break in the fiberoptic link.

14. The method of claim 11, further comprising:
detecting, based on the determined magnitude of the returning optical test signal being less than the reference magnitude of the optical test signal, that there is a deterioration in the fiberoptic link.

15. The method of claim 11, where the wavelength-selective reflector is optically coupled to the fiberoptic link.

16. The method of claim 11, where
the wavelength-selective reflector is configured to redirect the optical test signal at a first wavelength, and
the first wavelength is a test wavelength.

17. The method of claim 16, further comprising:
propagating an information signal, at a second wavelength, to an antenna.

18. The method of claim 11, where
the returning optical test signal is a first returning optical test signal,
the fiberoptic link is a first fiberoptic link, and
the method further comprises:
- determining a magnitude of a second returning optical test signal;
- determining a modulation frequency offset of the second returning optical test signal relative to a current value of a periodically swept modulation frequency; and
- detecting fault information in a second fiberoptic link.

19. The method of claim 18, where detecting the fault information in the second fiberoptic link includes:
detecting the fault information in the second fiberoptic link, based on a comparison of at least one of:
- the determined magnitude of the second returning optical test signal and the reference magnitude of the optical test signal; or
- a comparison between the determined modulation frequency offset of the second returning optical test signal to a reference modulation frequency offset of the optical test signal.

20. The method of claim 11, where the returning optical test signal is based on a test signal that is modulated at the periodically swept modulation frequency.

\* \* \* \* \*